(12) United States Patent
Yasuda

(10) Patent No.: US 11,907,172 B2
(45) Date of Patent: Feb. 20, 2024

(54) INFORMATION PROCESSING SYSTEM, INFORMATION PROCESSING METHOD, AND RECORDING MEDIUM

(71) Applicant: NEC Corporation, Tokyo (JP)

(72) Inventor: Junichi Yasuda, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/911,170

(22) PCT Filed: Mar. 11, 2021

(86) PCT No.: PCT/JP2021/009754
§ 371 (c)(1),
(2) Date: Sep. 13, 2022

(87) PCT Pub. No.: WO2021/187305
PCT Pub. Date: Sep. 23, 2021

(65) Prior Publication Data
US 2023/0105184 A1    Apr. 6, 2023

(30) Foreign Application Priority Data

Mar. 17, 2020    (JP) .................................. 2020-046350

(51) Int. Cl.
G06F 7/02        (2006.01)
G06F 16/00       (2019.01)
G06F 16/182      (2019.01)

(52) U.S. Cl.
CPC ................................. G06F 16/182 (2019.01)

(58) Field of Classification Search
CPC .................................................. G06F 16/182
See application file for complete search history.

(56) References Cited

U.S. PATENT DOCUMENTS 11,410,111 B1 * 8/2022 Washam ................ G06N 20/00
2010/0274762 A1   10/2010 Murphy et al.
(Continued)

FOREIGN PATENT DOCUMENTS

JP    2012-524947 A    10/2012
JP    2015-179410 A    10/2015
(Continued)

OTHER PUBLICATIONS

International Search Report for PCT Application No. PCT/JP2021/009754, dated Jun. 15, 2021.
(Continued)

*Primary Examiner* — Bruce M Moser
(74) *Attorney, Agent, or Firm* — Sughrue Mion, PLLC

(57) ABSTRACT

An information processing system preserves data used in machine learning by distributing the data to a plurality of servers, reads setting information indicating a method of partitioning for cross-validation in the machine learning, specifies, based on the setting information, a validation server that executes the cross-validation among the plurality of servers, and validation data which is data used in the cross-validation, specifies an arrangement of the data in the plurality of servers, specifies deficiency data, which is data that is included in the validation data and that is not stored in the validation server, and causes a server that stores the deficiency data among the plurality of servers to transmit the deficiency data to the validation server, based on an arrangement of the specified deficiency data.

7 Claims, 5 Drawing Sheets

(56) References Cited

U.S. PATENT DOCUMENTS

| | | |
|---|---|---|
| 2015/0269086 A1 | 9/2015 | Yasuda |
| 2017/0262310 A1 | 9/2017 | Kuromatsu et al. |
| 2020/0336398 A1* | 10/2020 | Thomas .............. H04L 43/0876 |
| 2023/0121404 A1* | 4/2023 | Liu .......................... G06N 3/04 |
| | | 706/25 |

FOREIGN PATENT DOCUMENTS

| | | |
|---|---|---|
| JP | 2017-162209 A | 9/2017 |
| WO | 2010/124024 A2 | 10/2010 |

OTHER PUBLICATIONS

N. Kuromatsu et al., "wizz: Platform-Transparent Machine Learning Platform", IPSJ SIG technical report, High Performance Computing (HPC), vol. 2015-HPC-150, No. 18, 2015, pp. 1-9.

* cited by examiner

FIG. 2

| DATA NUMBER | SALES | DATE AND TIME | CUSTOMER ID | STORE | GENDER | NAME | WEATHER | |
|---|---|---|---|---|---|---|---|---|
| 1 2 3 | | | | | | | | ~BLOCK A |
| 4 5 6 | | | | | | | | ~BLOCK B |
| 7 8 9 | | | | | | | | ~BLOCK C |
| 10 11 12 | | | | | | | | ~BLOCK D |
| 13 14 15 | | | | | | | | ~BLOCK E |

FIG. 3

ALL LEARNING PATTERN 1
VALIDATION SERVER:SERVER 10A
VALIDATION DATA:BLOCK A
LEARNING DATA:BLOCK B, BLOCK C, BLOCK D, BLOCK E

ALL LEARNING PATTERN 2
VALIDATION SERVER:SERVER 10B
VALIDATION DATA:BLOCK B
LEARNING DATA:BLOCK A, BLOCK C, BLOCK D, BLOCK E

FIG. 4

|        | SERVER 10A | SERVER 10B | SERVER 10C |
|--------|------------|------------|------------|
| MASTER | 1          | 2          | 3          |
|        | 11         | 10         | 8          |
|        | 9          | 14         | 15         |
|        | 6          | 4          | 5          |
|        | 7          | 13         | 12         |
| REPLICA| 15         | 1          | 14         |
|        | 4          | 3          | 2          |
|        | 7          | 12         | 11         |
|        | 10         | 8          | 13         |
|        | 9          | 6          | 5          |

INFORMATION PROCESSING SYSTEM, INFORMATION PROCESSING METHOD, AND RECORDING MEDIUM

This application is a National Stage Entry of PCT/JP2021/009754 filed on Mar. 11, 2021, which claims priority from Japanese Patent Application 2020-046350 filed on Mar. 17, 2020, the contents of all of which are incorporated herein by reference, in their entirety.

TECHNICAL FIELD

The present invention relates to an information processing system, an information processing method, and a recording medium.

BACKGROUND ART

Patent Document 1 discloses a technique for preventing loss of backup data by dynamically evaluating the characteristics of storage nodes in a distributed file system and making an optimum arrangement decision.

PRIOR ART DOCUMENTS

Patent Documents

Patent Document 1: Published Japanese translation No. 2012-524947

SUMMARY OF THE INVENTION

Problems to be Solved by the Invention

There has been known a technique in which, in an information processing system that preserves data in a distributed manner in a plurality of servers, the data is learned to generate learned models. Moreover partitioning learning data and validation data causes a bias to occur in learning data, and this potentially results in a reduced accuracy of generated learned models. Thus, there has been known a technique for increasing accuracy by generating a learned model multiple times while changing the method of partitioning learning data and validation data.

In order to generate a learned model multiple times in an information processing system such as the one mentioned above, it is necessary to move validation data to the verification server each time validation is performed, and this delays validation of the learned model and results in significant resource consumption.

An example object of the present invention is to provide an information processing system, an information processing method, and a recording medium capable of solving the above problems.

Means for Solving the Problem

An information processing system according to an example aspect of the present invention is an information processing system that preserves data used in machine learning by distributing the data to a plurality of servers, and includes: a first reading means that reads setting information indicating a method of partitioning for cross-validation in the machine learning; an analysis means that specifies, based on the setting information, a validation server that executes the cross-validation among the plurality of servers, and validation data which is data used in the cross-validation; a second reading means that specifies an arrangement of the data in the plurality of servers; and a control means that specifies deficiency data, which is data that is included in the validation data and that is not stored in the validation server, and that causes a server that stores the deficiency data among the plurality of servers to transmit the deficiency data to the validation server, based on an arrangement of the specified deficiency data.

An information processing method according to an example aspect of the present invention is an information processing method executed by an information processing system that preserves data used in machine learning by distributing the data to a plurality of servers, the method including: reading setting information indicating a method of partitioning for cross-validation in the machine learning; specifying, based on the setting information, a validation server that executes the cross-validation among the plurality of servers, and validation data which is data used in the cross-validation; specifying an arrangement of the data in the plurality of servers; specifying deficiency data, which is data that is included in the validation data and that is not stored in the validation server; and causing a server that stores the deficiency data among the plurality of servers to transmit the deficiency data to the validation server, based on an arrangement of the specified deficiency data.

A recording medium according to an example aspect of the present invention has stored therein a program that causes a computer of an information processing system that preserves data used in machine learning by distributing the data to a plurality of servers, to execute: reading setting information indicating a method of partitioning for cross-validation in the machine learning; specifying, based on the setting information, a validation server that executes the cross-validation among the plurality of servers, and validation data which is data used in the cross-validation; specifying an arrangement of the data in the plurality of servers; specifying deficiency data, which is data that is included in the validation data and that is not stored in the validation server; and causing a server that stores the deficiency data among the plurality of servers to transmit the deficiency data to the validation server, based on an arrangement of the specified deficiency data.

Effect of the Invention

According to at least one of the above example aspects, in an information processing system that preserves data in a distributed manner in a plurality of servers, it is possible to reduce the length of time and resources required for cross-validating a learning model that has been generated multiple times.

BRIEF DESCRIPTION OF THE DRAWINGS

FIG. 2 is a diagram showing an example of sales data according to an example embodiment.

FIG. 3 is a diagram showing an example of all learning patterns according to an example embodiment.

FIG. 4 is an example showing a data arrangement on a server according to an example embodiment.

EXAMPLE EMBODIMENT

First Example Embodiment

<<Configuration of Information Processing System>>

Hereinafter, a configuration of an information processing system 1 according to a first example embodiment will be described in detail, with reference to the drawings.

Figure 1:
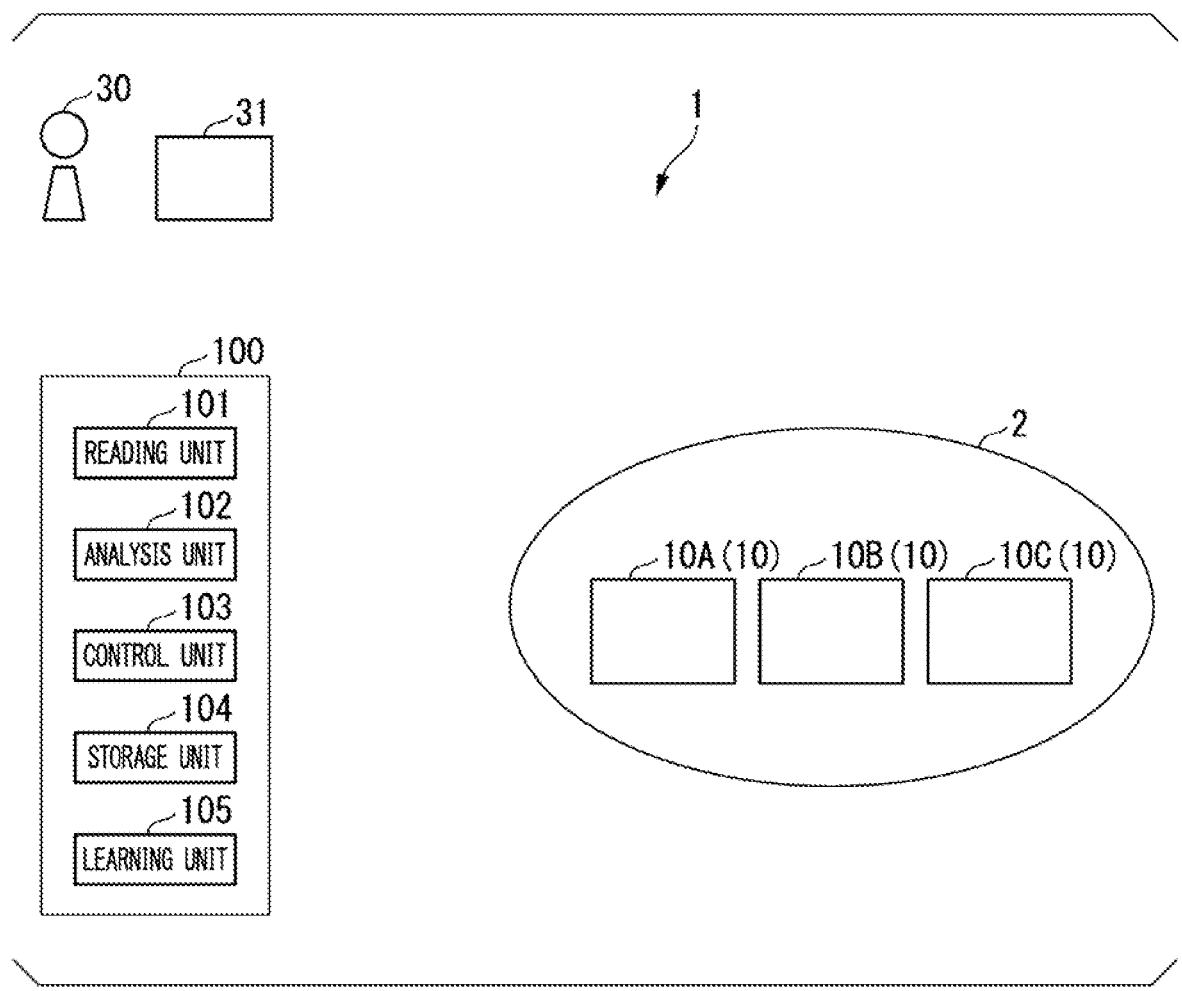
FIG. 1 is a diagram showing a configuration of an information processing system according to an example embodiment.

FIG. 1 is a diagram showing a configuration of the information processing system 1 according to the first example embodiment.

The information processing system 1 is a system that preserves data used in machine learning in a distributed manner in a distributed environment 2. The information processing system 1 cross-validates a generated learned model. Moreover, the information processing system 1 is a system that transmits replicas (replicated copies, replicated data) to a server on which validation is performed, among a plurality of servers 10 included in the distributed environment 2.

The information processing system 1 includes a distributed environment 2, a reading source 31, and an optimization device 100.

The distributed environment 2 includes server 10A, server 10B, and server 10C. The server 10A, the server 10B, and the server 10C may be collectively referred to as servers 10.

The distributed environment 2 preserves master data of data and a replica of the data by distributing them to the plurality of servers 10. The servers 10 store data and replicas distributed by means of software (not shown in the drawings) implemented on the servers 10. Examples of the software mentioned above include a distributed processing middleware. Moreover, a replica generation device (not shown in the drawings) provided in the servers 10 replicates data stored in the servers 10 to generate a replica thereof, and records it in any of the plurality of servers 10.

The reading source 31 is a device that accepts an input of learning pattern setting information from a user 30 of the information processing system 1, and that stores the learning pattern setting information related to the input. The learning pattern setting information is an example of setting information. The reading source 31 includes a receiving unit (not shown in the drawings) and a storage device (not shown in the drawings). The learning pattern setting information received from the user 30 by the reading source 31 indicates a target data type, a partitioning method, a validation server, and a learning method. The receiving unit records the received learning pattern setting information in the storage device.

Hereinafter, an input received by the reading source 31 from the user 30 will be described in detail.

The target data type is a type of data stored in the distributed environment 2 that is a target of learning or validation of machine learning performed by the optimization device 100.

For example, suppose that sales data, inventory data, and order data are stored in the servers 10 of the distributed environment 2. The optimization device 100 generates a learned model for sales forecast by learning the sales data.

In such a case, the user 30 inputs "sales data" as a target data type to the reading source 31.

The partitioning method is a method of partitioning for cross-validation in machine learning. Cross-validation is a method in which data stored in the distributed environment 2 is partitioned into learning data and validation data, and a learned model based on the learning data is validated using the validation data.

FIG. 2 is a diagram showing an example of sales data. The partitioning method will be described, with reference to the above example.

The sales data is data that includes, as items, data number, sales, date and time, customer ID, store, gender, name, and weather. The sales data is 15 lines of data, and is data from data number 1 to data number 15.

In the case of performing k-fold cross-validation, if learning and validation are to be performed five times (if the number of partitions k=5), the sales data is partitioned into five blocks as shown in FIG. 2. That is to say, the sales data is partitioned into block A, block B, block C, block D, and block E. Block A is sales data from data number 1 to data number 3. Block B is sales data from data number 4 to data number 6. Block C is sales data from data number 7 to data number 9. Block D is sales data from data number 10 to data number 12. Block E is sales data from data number 13 to data number 15.

When partitioning the sales data as described above, the user 30 inputs "partition into five" to the reading source 31 as the partitioning method.

As the partitioning method, the user 30 may input to the reading source 31 a partitioning method on the basis of the number of lines of the data and the size of the data. For example, the user 30 may input "partition every 5 lines" into the reading source 31. In such a case, the sales data is partitioned into 3 blocks.

The validation server is the servers 10 of the distributed environment 2 in which validation of machine learning is performed. For example, in the case where the user 30 validates machine learning using the server 10A and the server 10B, the user 30 inputs "server 10A" and "server 10B" to the reading source 31 as the validation server.

<<Configuration of Optimization Device>>

Hereinafter, the configuration of the optimization device 100 will be described in detail.

The optimization device 100 receives information from the reading source 31 and generates a learned model by machine-learning data of the distributed environment 2.

The optimization device 100 includes a reading unit 101, an analysis unit 102, a control unit 103, a storage unit 104, and a learning unit 105.

The reading unit 101 reads learning pattern setting information from the reading source 31. The reading unit 101 is an example of the first reading means.

The analysis unit 102 specifies a validation server and validation data on the basis of the learning pattern setting information read by the reading unit 101. The validation data is data used for validating machine learning. The analysis unit 102 is an example of the analysis means. The analysis unit 102 generates all learning patterns, associating the specified validation server and the validation data with each other. FIG. 3 is a diagram showing an example of all learning patterns.

In all learning patterns 1, the server 10A serving as a validation server, block A serving as validation data, and block B, block C, block D, and block E serving as learning data are associated with each other. In all learning patterns 2, the server 10B serving as information indicating a validation server, block B serving as validation data, and block A, block C, block D, and block E serving as learning data are associated with each other.

The analysis unit 102 records all generated learning patterns in the storage unit 104.

The control unit 103 specifies the arrangement of data in the plurality of servers 10. The control unit 103 is an example of the second reading means.

FIG. 4 is an example showing a data arrangement on the plurality of servers 10.

As shown in FIG. 4, master data of the sales data and a replica of the sales data are stored in the server 10A, the server 10B, and the server 10C. The example shown in FIG. 4 is an example in which the master data and the replica of the data are randomly arranged and stored. Hereinafter, data of data number N will be referred to as data N. Furthermore, a replica corresponding to the data of data number N will be referred to as replica N.

The server 10A stores data 1, data 11, data 9, data 6, and data 7, which are master data. Also, the server 10A stores replica 15, replica 4, replica 7, replica 10, and replica 9.

The control unit 103 specifies deficiency data, which is data within the validation data and neither the master data nor the replica of which is stored in the validation server, on the basis of all the learning patterns stored in the storage unit 104, and causes another server 10 to transmit the replica of the deficiency data to the validation server, on the basis of the specified arrangement (specified deficiency data arrangement). The control unit 103 is an example of the control means.

For example, the validation server in all the learning patterns 1 is the server 10A. The validation data in all the learning patterns 1 is the block A. As shown in FIG. 4, the server 10A, which is a validation server, stores only data 1 of the data belonging to the block A or the replica corresponding to the data. That is to say, the deficiency data on the server 10A, which is the validation server, is data 2 and data 3. Therefore, the control unit 103 transmits the replica 3 stored in the server 10B and the replica 2 stored in the server 10C to the server 10A.

Specifically, the control unit 103 compares the validation server in all learning patterns with the read arrangement, and determines whether or not validation data or a replica corresponding to the validation server is present in the validation server. If the validation data or the replica corresponding to the validation data is not present in the validation server, the control unit 103 transmits the replica to the validation server.

The storage unit 104 is a storage medium that stores all learning patterns. Examples of the storage unit 104 include a hard disk.

The learning unit 105 generates a learned model by means of machine learning of the data of the servers 10 in the distributed environment 2, on the basis of learning pattern setting information. The learning unit 105 performs cross-validation on the generated learned model. The learning unit 105 is an example of the learning means.

For example, the learning unit 105 generates a learned model on the basis of learning pattern setting information, and performs cross-validation of the learned model. The learning unit 105 generates a learned model by machine-learning the data that belongs to the block B, the block C, the block D, and the block E of the distributed environment 2. The learning unit 105 generates a learning model, using the value of an item of sales as an objective variable and the value of an item other than sales as an input variable in the data. Moreover, in the server 10A, which is a validation server, the learning unit 105 finds the accuracy by comparing the value obtained as a result of substituting data belonging to the block A into the learned model, with the value of the sales item of the data, to thereby perform validation. In the validation, the data 1 stored in the server 10A, and the replica 2 and the replica 3 moved from the server 10B and the server 10C by the control unit 103 are used. Also, the learning unit 105 generates a learned model by machine-learning the data that belongs to the block A, the block C, the block D, and the block E of the distributed environment 2. The learning unit 105 performs validation by finding the accuracy on the basis of the value of the sales item of the block B. In this manner, the learning unit 105 performs machine learning while changing validation data, and compares a plurality of learned models to perform cross-validation. By adjusting the weight associated with the input variable by means of cross-validation, it is possible to increase the accuracy of the learned model.

<<Operations of Information Processing System>>

Hereinafter, operations of the information processing system 1 will be described.

Figure 5:
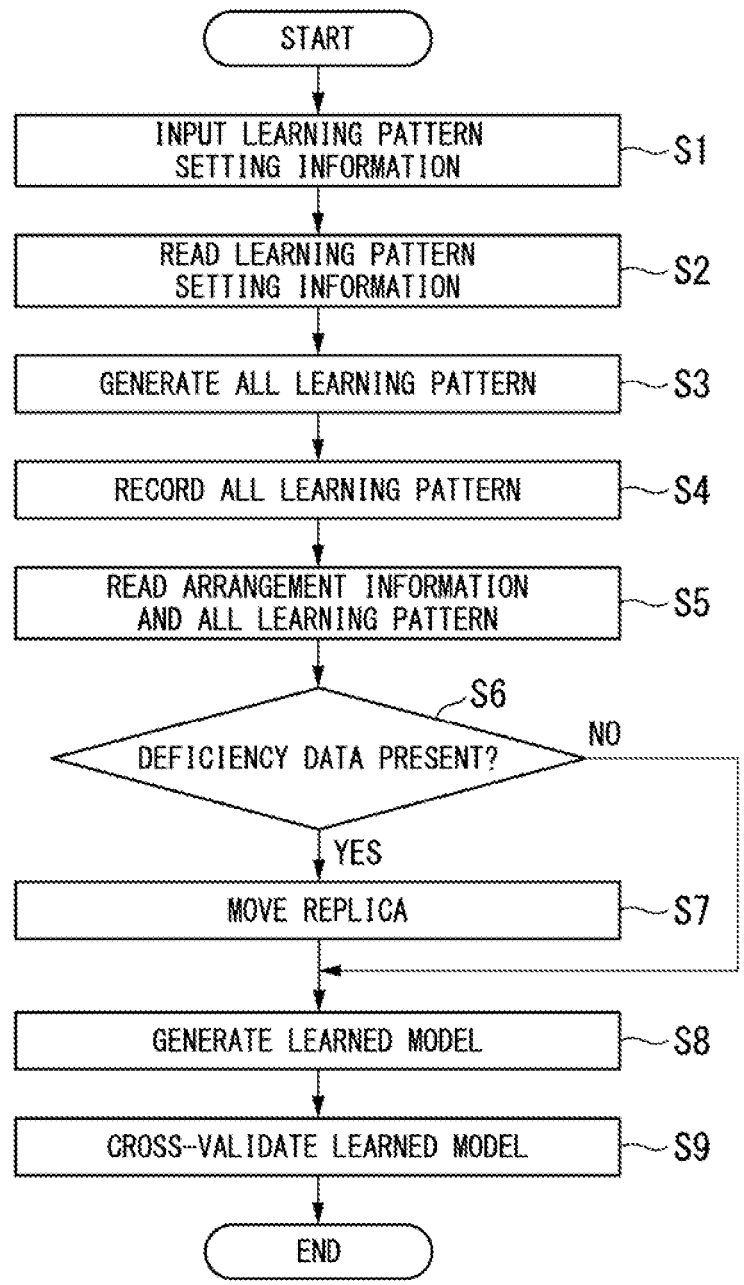
FIG. 5 is a flowchart showing operations of the information processing system according to an example embodiment.

FIG. 5 is a flowchart showing operations of the information processing system 1.

The user 30 inputs a target data type, a partitioning method, and a validation server into the reading source 31 (Step S1). The information input into the reading source 31 is recorded in the storage device as learning pattern setting information.

The reading unit 101 reads the learning pattern setting information stored in the reading source 31 (Step S2).

The analysis unit 102 specifies the validation server, the validation data, and the target data type on the basis of the learning pattern setting information read by the reading unit 101, and generates all learning patterns (Step S3).

The analysis unit 102 records all generated learning patterns in the storage unit 104 (Step S4).

The control unit 103 specifies the arrangement of the distributed environment 2 and reads all the learning patterns stored in the storage unit 104 (Step S5).

The control unit 103 determines whether or not deficiency data, which is data within the validation data and neither master data nor a replica of which is stored in the validation server, is present (Step S6).

If deficiency data is present (Step S6: YES), the control unit 103 causes another server 10 to transmit a replica of the deficiency data to the validation server, on the basis of the specified deficiency data arrangement (Step S7).

After having had the replica transmitted, the learning unit 105 generates a learned model by means of machine learning (Step S8). Then, the learning unit 105 performs cross-validation on the learning model (Step S9).

If deficiency data is not present (Step S6: NO), the learning unit 105 generates a learned model by means of machine learning (Step S8). Then, the learning unit 105 performs cross-validation on the learning model (Step S9).

Through the operations described above, the information processing system 1 can reduce the length of time and resources required for cross-validating learning models generated by machine-learning the data in the distributed environment 2.

<<Action and Effect>>

The information processing system 1 according to the example embodiment of the present invention is an information processing system 1 that preserves data used in machine learning by distributing it to the plurality of servers 10, the information processing system 1 including: a first reading means that reads setting information indicating a method of partitioning for cross-validation in the machine learning; an analysis means that specifies, on the basis of the setting information, a validation server among the plurality of servers 10 that executes cross-validation, and validation data which is data used in cross-validation; a second reading means that specifies an arrangement of data in the plurality of servers 10; and a control means that specifies deficiency data, which is data within the validation data that is not stored in the validation server, and that causes another server to transmit the deficiency data to the validation server, on the basis of the arrangement of the specified deficiency data.

By causing the deficiency data to be transmitted to the validation server, the information processing system 1 can reduce the length of time and resources required for cross-validating learning models generated by machine-learning the data in the distributed environment 2.

The plurality of servers 10 of the information processing system 1 store master data of data and a replica of the data in a distributed manner; the second reading means specifies the arrangement of the master data and the replica on the plurality of servers 10; the control means specifies deficiency data, which is data within validation data and neither master data nor a replica of which is stored in the validation server; and another server 10 is caused to transmit a replica of the deficiency data to the validation server, on the basis of the specified deficiency data arrangement.

By causing the replica of the deficiency data to be transmitted to the validation server, the information processing system 1 can reduce the length of time and resources required for cross-validating learning models generated by machine-learning the data in the distributed environment 2.

The information processing system 1 includes a learning means that generates a learned model, on the basis of setting information.

The user of the information processing system 1 can generate a learned model by means of machine learning in a system that can reduce the length of time and resources required for cross-validation.

The setting information in the information processing system 1 indicates the method of partitioning, and the type of data of the learning or the validation target of the machine learning, and the analysis means specifies the validation server, the validation data, and the type, on the basis of the setting information.

The information processing system 1 specifies validation data, on the basis of the setting information indicating the type of target data. As a result, by causing only the deficiency data corresponding to the target data type to be transmitted to the validation server, it is possible to reduce the length of time and resources required for cross-validation.

The information processing method according to the example embodiment of the present invention is executed by the information processing system 1 that preserves data used in machine learning in a distributed manner in the plurality of servers 10, the information processing system 1 including steps of: reading setting information indicating a method of partitioning for cross-validation in the machine learning; specifying, on the basis of the setting information, a validation server among the plurality of servers 10 that executes cross-validation, and validation data which is data used in cross-validation; specifying an arrangement of data in the plurality of servers 10; specifying deficiency data, which is data within the validation data that is not stored in the validation server, and causing another server 10 to transmit the deficiency data to the validation server, on the basis of the arrangement of the specified deficiency data.

The user of the information processing method uses the information processing method to transmit deficiency data to the validation server. As a result, the user of the information processing method can reduce the length of time and resources required for cross-validating learning models generated by machine-learning the data in the distributed environment 2.

A program according to the example embodiment of the present invention causes a computer of the information processing system 1 that preserves data used in machine learning in a distributed manner in the plurality of servers 10 to execute steps of: reading setting information indicating a method of partitioning for cross-validation in the machine learning; specifying, on the basis of the setting information, a validation server among the plurality of servers 10 that executes cross-validation, and validation data which is data used in cross-validation; specifying an arrangement of data in the plurality of servers 10; and specifying deficiency data, which is data within the validation data that is not stored in the validation server, and that causes another server 10 to transmit the deficiency data to the validation server, on the basis of the arrangement of the specified deficiency data.

The user of the program causes the program to be executed to transmit deficiency data to the validation server. As a result, the user of the program can reduce the length of time and resources required for cross-validating learning models generated by machine-learning the data in the distributed environment 2.

Second Example Embodiment

Hereinafter, the information processing system 1 according to a second example embodiment will be described.

The information processing system 1 according to the second example embodiment is a system that also specifies a target item as learning pattern setting information and transmits a replica of the target item of deficiency data of a validation server.

The configuration of the information processing system 1 according to the second example embodiment is similar to that of the information processing system 1 according to the first example embodiment.

The learning pattern setting information according to the second example embodiment indicates a partitioning method, target data, and target items. The target items are items of the learning target or validation target of machine learning.

For example, assume that the type of target data is sales data as shown in FIG. 2. The sales data is data that includes, as items, except for data numbers, as sales, date and time, customer ID, store, gender, name, and weather. In the case where generation of a learned model required only with use of items of sales, date and time, and gender, the user 30 inputs "sales", "date and time", and "gender" to the reading source 31 as target items. The reading source 31 indicates the items of sales, date and time, and gender as target items in the learning pattern setting information, and records them in the storage device.

The control unit 103 specifies deficiency data, which is data within the validation data that is not stored in the validation server, and that causes another server to transmit the target items of the deficiency data to the validation server, on the basis of the specified arrangement. That is to say, the control unit 103 causes only the items of sales, date and time, and gender among the deficiency data to be transmitted to the validation server. As a result, the need for transmitting all items of the deficiency data is eliminated.

Therefore, the information processing system 1 according to the second example embodiment can reduce the length of time and resources required for cross-validation.

<<Action and Effect>>

The setting information of the information processing system 1 according to the present invention indicates the method of partitioning, the target data, and the target items that serve as the learning or validation target of the machine learning; the analysis means specifies the validation server, the validation data, the type, and the target items, on the basis of the setting information; the control means specifies deficiency data which is data within the validation data that is not stored in the validation server; and another server 10 is caused to transmit the target items of the deficiency data to the validation server, on the basis of the specified arrangement.

As a result, the need for transmitting all items of the deficiency data is eliminated. Therefore, the information processing system 1 can reduce the length of time and resources required for cross-validation.

Other Example Embodiments

The example embodiments of the present invention have been described in detail with reference to the drawings. However, the specific configuration of the invention is not limited to the example embodiments described above, and various design changes may be made thereto.

The information processing system 1 according to the example embodiments described above accepts input of learning pattern setting information from the user 30, however, the example embodiments are not limited to such an example. For example, past information may be recorded and learning pattern setting information may be automatically generated on the basis of the information. Thereby, the user 30 does not have to accept input of learning pattern setting information, and as a result, the length of time required for cross-validation can be reduced.

Moreover, transmission of deficiency data or replicas performed by the control unit 103 may be performed at times when the learning unit 105 is performing machine learning or at times such as midnight when the operation load on the distributed environment 2 is low. As a result, it is possible to distribute the operation load on the distributed environment 2 caused by deficiency data transmission to times when the operation load is low.

Even in a case where the distributed environment 2 generates two or more replicas for each master data, the information processing system 1 may cause only one replica corresponding to deficiency data to be transmitted to the validation server.

Furthermore, in the information processing system 1, information related to deficiency data may be transmitted to the distributed environment 2 before replicas of the deficiency data are generated, so that replicas of the deficiency data are generated in the validation server.

<Basic Configuration>

The configuration of an example embodiment according to a basic configuration is a configuration in which the storage unit 104 and the learning unit 105 are removed from the configuration of the first example embodiment described above. That is to say, the optimization device 100 of the information processing system 1 according to the basic configuration includes the reading unit 101, the analysis unit 102, and the control unit 103.

Figure 6:
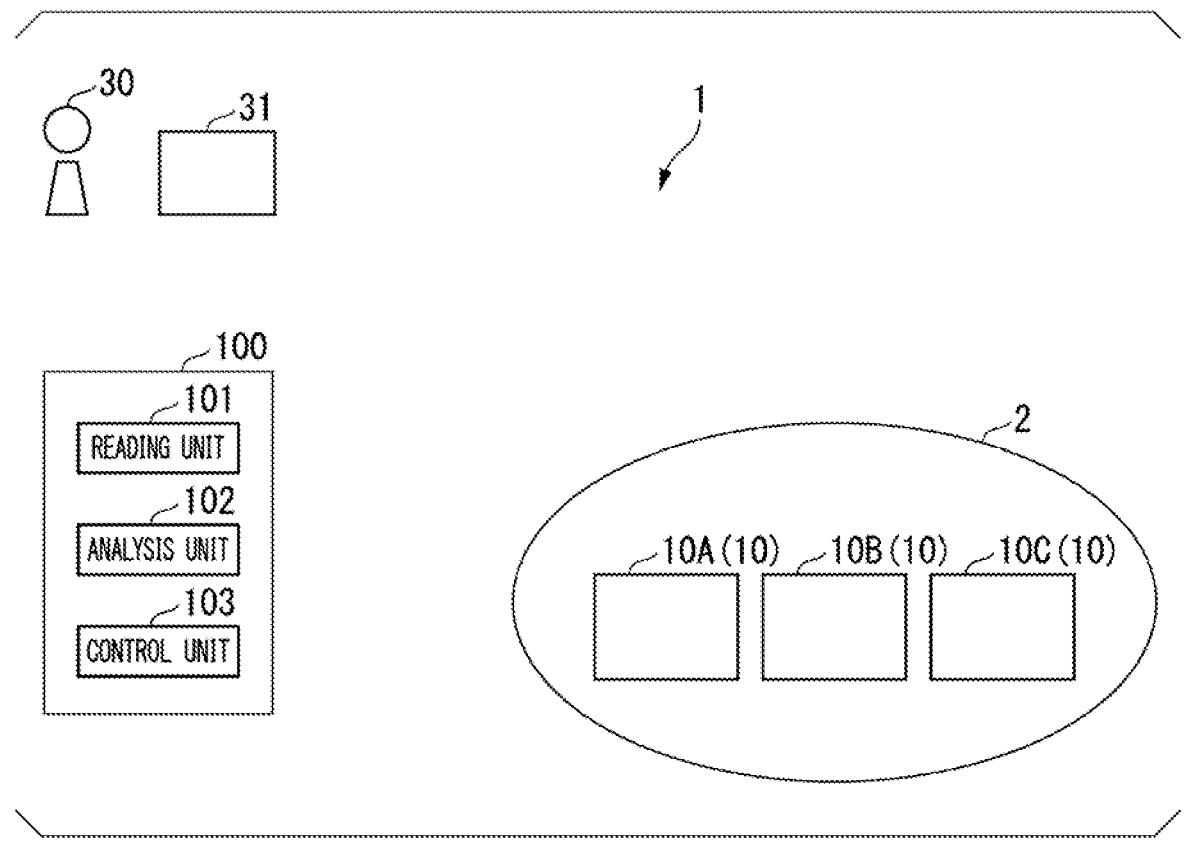
FIG. 6 is a diagram showing a configuration of an information processing system according to a basic configuration.

FIG. 6 is a diagram showing the configuration of the information processing system 1 according to the basic configuration.

The information processing system 1 according to the basic configuration preserves data used in machine learning in a distributed manner in the plurality of servers 10, and includes: a first reading means that reads setting information indicating a method of partitioning for cross-validation in the machine learning; an analysis means that specifies, on the basis of the setting information, a validation server among the plurality of servers 10 that executes cross-validation, and validation data which is data used in cross-validation; a second reading means that specifies an arrangement of data in the plurality of servers 10; and a control means that specifies deficiency data, which is data within the validation data that is not stored in the validation server, and that causes another server to transmit the deficiency data to the validation server, on the basis of the arrangement of the specified deficiency data.

By causing the deficiency data to be transmitted to the validation server, the information processing system 1 can reduce the length of time and resources required for cross-validating learning models generated by machine-learning the data in the distributed environment 2.

<Computer Configuration>

Figure 7:
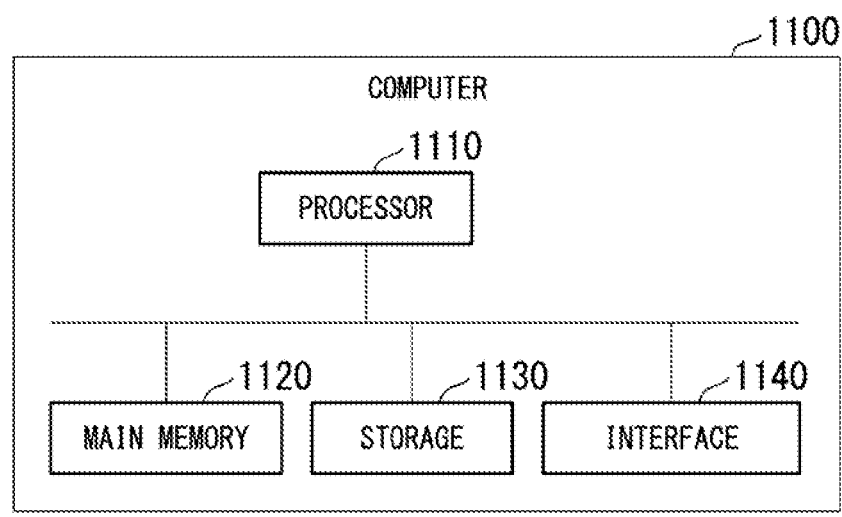
FIG. 7 is a schematic block diagram showing a configuration of a computer according to at least one of the example embodiments.

FIG. 7 is a schematic block diagram showing a configuration of a computer according to at least one example embodiment.

A computer 1100 includes a processor 1110, a main memory 1120, a storage 1130, and an interface 1140.

The optimization device 100 described above is implemented in the computer 1100. The operation of each processing unit described above is stored in the storage 1130 in the form of a program. The processor 1110 reads out the program from the storage 1130, loads it on the main memory 1120, and executes the processes described above according to the program. Moreover, the processor 1110 secures, according to the program, memory storage regions corresponding to the respective storage units mentioned above, in the main memory 1120.

The program may be a program for realizing some of the functions exerted by the computer 1100. For example, the program may exert the functions in combination with another program already stored in the storage 1130, or in combination with another program implemented on another device. It should be noted that, in another example embodiment, the computer 1100 may include a custom LSI (Large Scale Integrated Circuit) such as a PLD (Programmable Logic Device) in addition to or in place of the above configuration. Examples of PLDs include PAL (Programmable Array Logic), GAL (Generic Array Logic), CPLD (Complex Programmable Logic Device), and FPGA (Field Programmable Gate Array). In such a case, some or all of the functions realized by the processor 1110 may be realized by an integrated circuit.

Examples of the storage 1130 include magnetic disks, magnetic optical disks, and semiconductor memories. The storage 1130 may be an internal medium directly connected to the bus of the computer 1100, or an external medium connected to the computer via the interface 1140 or a communication line. In the case where this program is distributed to the computer 1100 via a communication line, the computer 1100 which has received the program distribution may load the program onto the main memory 1120 and may execute the above processes. In at least one of the example embodiments, the storage 1130 is a non-transitory tangible storage medium.

Moreover, this program may be a program for realizing some of the functions described above. Also, the program may be a so-called difference file (a difference program) which realizes the functions described above in combination with another program already stored in the storage 1130.

This application is based upon and claims the benefit of priority from Japanese patent application No. 2020-046350, filed Mar. 17, 2020, the disclosure of which is incorporated herein in its entirety.

INDUSTRIAL APPLICABILITY

The present invention may be applied to an information processing system, an information processing method, and a recording medium.

DESCRIPTION OF REFERENCE SYMBOLS

1 Information processing system
2 Distributed environment
10 Server
30 User
31 Reading source
101 Reading unit
102 Analysis unit
103 Control unit
104 Storage unit
105 Learning unit
1100 Computer
1110 Processor
1120 Main memory
1130 Storage
1140 Interface

What is claimed is:

1. An information processing system that preserves data used in machine learning by distributing the data to a plurality of servers, the information processing system comprising:
    at least one memory configured to store instructions; and
    at least one processor configured to execute the instructions to:
        read setting information indicating a method of partitioning for cross-validation in the machine learning;
        specify, based on the setting information, a validation server that executes the cross-validation among the plurality of servers, and validation data which is data used in the cross-validation;
        specify an arrangement of the data in the plurality of servers;
        specify deficiency data, which is data that is included in the validation data and that is not stored in the validation server; and
        cause a server that stores the deficiency data among the plurality of servers to transmit the deficiency data to the validation server, based on an arrangement of the specified deficiency data.

2. The information processing system according to claim 1,
    wherein the plurality of servers store master data of the data and a replica of the data in a distributed manner,
    the at least one processor is configured to execute the instructions to:
        specify an arrangement of the master data and the replica in the plurality of servers; and
        specify the deficiency data, which is data included in the validation data and neither the master data nor the replica of which is stored in the validation servers; and
        cause the server that stores the deficiency data among the plurality of servers to transmit the replica of the deficiency data to the validation server, based on the arrangement of the specified deficiency data.

3. The information processing system according to claim 1, further comprising
    a learning means that generates a learned model, based on the setting information.

4. The information processing system according to claim 1,
    wherein the setting information indicates the method of partitioning, and the type of data that is a target of the learning or the validation of the machine learning, and
    the at least one processor is configured to execute the instructions to specify the validation server, the validation data, and the type, based on the setting information.

5. The information processing system according to claim 1,
    wherein the setting information indicates the method of partitioning, the target data, and a target item that serves as a target of the learning or the validation of the machine learning,
    the at least one processor is configured to execute the instructions:
        specify the validation server, the validation data, the type, and the target item, based on the setting information; and
        specify the deficiency data, which is data that is included in the validation data and that is not stored in the validation server; and
        cause the server that stores the deficiency data among the plurality of servers to transmit the target item of the deficiency data to the validation server, based on the arrangement of the specified deficiency data.

6. An information processing method executed by an information processing system that preserves data used in machine learning by distributing the data to a plurality of servers, the method comprising:
    reading setting information indicating a method of partitioning for cross-validation in the machine learning;
    specifying, based on the setting information, a validation server that executes the cross-validation among the plurality of servers, and validation data which is data used in the cross-validation;
    specifying an arrangement of the data in the plurality of servers;
    specifying deficiency data, which is data that is included in the validation data and that is not stored in the validation server; and
    causing a server that stores the deficiency data among the plurality of servers to transmit the deficiency data to the validation server, based on an arrangement of the specified deficiency data.

7. A non-transitory recording medium having stored therein a program that causes a computer of an information processing system that preserves data used in machine learning by distributing the data to a plurality of servers, to execute:
    reading setting information indicating a method of partitioning for cross-validation in the machine learning;
    specifying, based on the setting information, a validation server that executes the cross-validation among the plurality of servers, and validation data which is data used in the cross-validation;

specifying an arrangement of the data in the plurality of servers;

specifying deficiency data, which is data that is included in the validation data and that is not stored in the validation server; and causing a server that stores the deficiency data among the plurality of servers to transmit the deficiency data to the validation server, based on an arrangement of the specified deficiency data.

\* \* \* \* \*